UNITED STATES PATENT OFFICE.

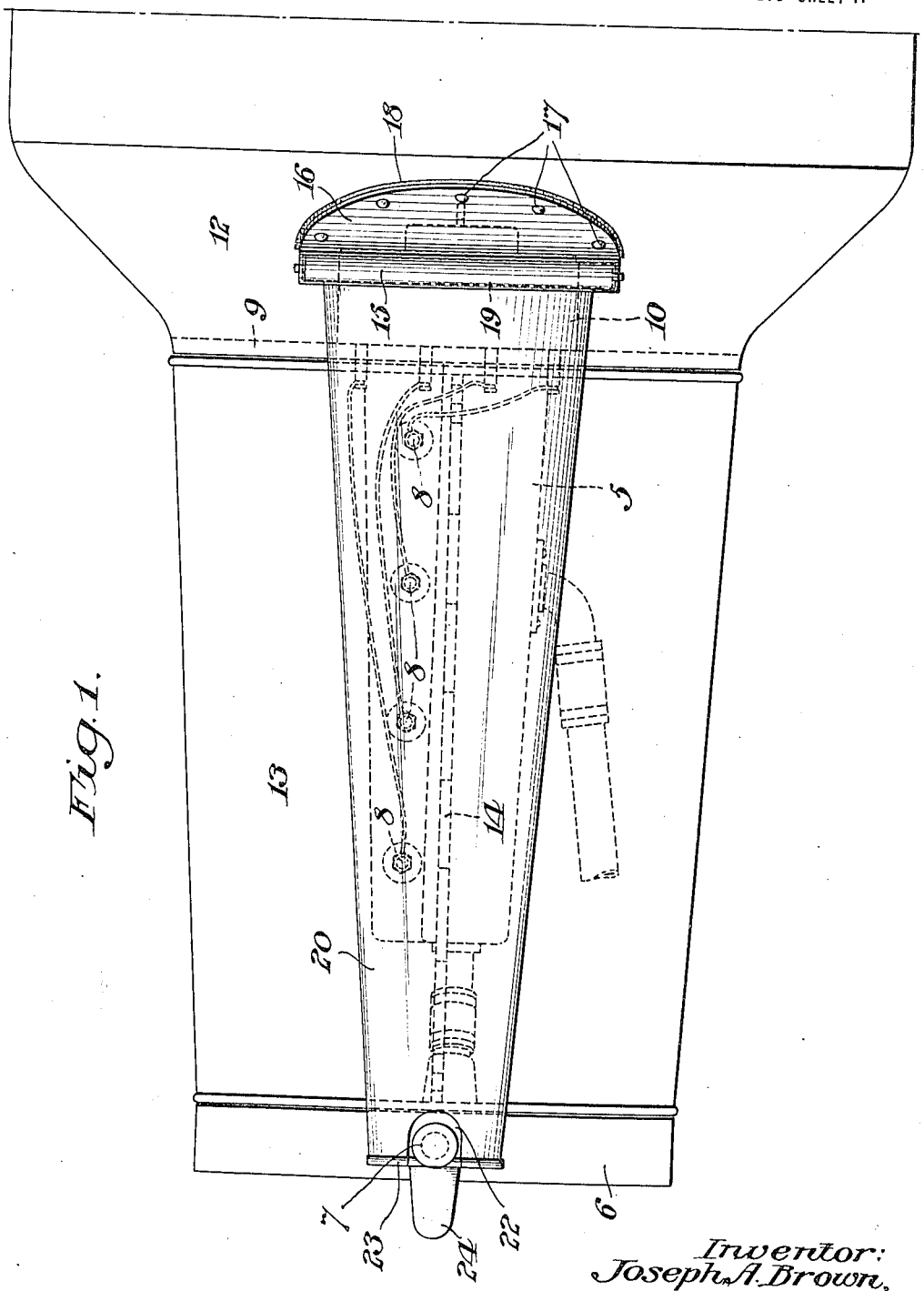

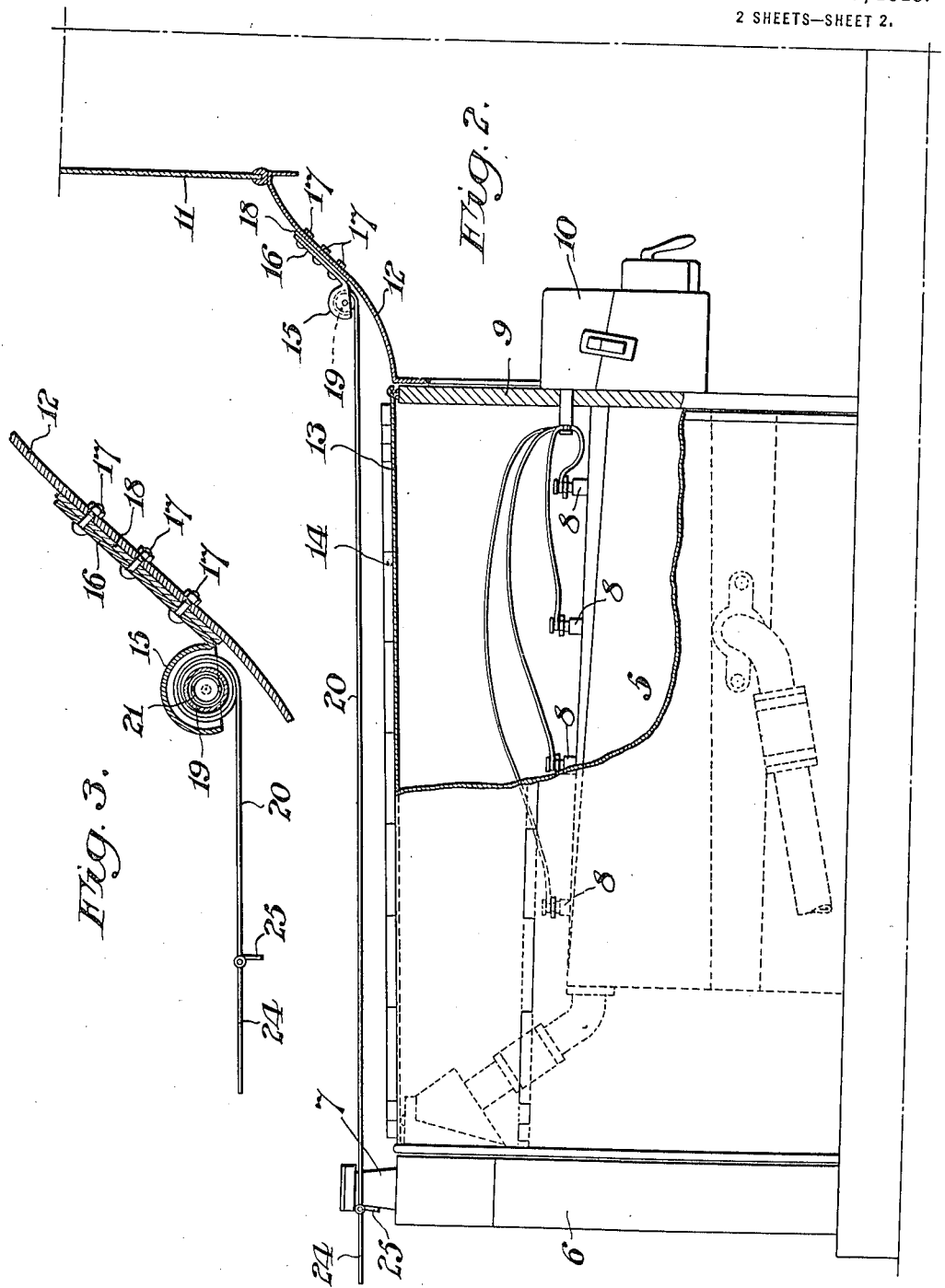

JOSEPH A. BROWN, OF PHILADELPHIA, PENNSYLVANIA.

RAIN-SHIELD FOR AUTOMOBILE-HOODS.

1,298,170.   Specification of Letters Patent.   Patented Mar. 25, 1919.

Application filed July 30, 1918. Serial No. 247,378.

*To all whom it may concern:*

Be it known that I, JOSEPH A. BROWN, a citizen of the United States, residing at Philadelphia, in the county of Philadelphia and State of Pennsylvania, have invented certain new and useful Improvements in Rain-Shields for Automobile-Hoods, of which the following is a specification.

My invention relates to rain shields for automobile hoods, that is to say, to a device adapted to be attached to an automobile and adapted during heavy rain storms to prevent the entrance of water to the interior parts of the engine, which frequently occurs, resulting in short-circuiting the electrical parts of the power unit of the automobile, such as the coil box and spark plugs. Specifically considered my invention contemplates a device adapted to be mounted upon the cowl of the automobile, between the wind shield and the hood which ordinarily covers the engine and its associated parts, which device is provided with an auxiliary covering apron adapted to be brought into operative condition when occasion requires, but which ordinarily is arranged with the covering apron retracted so that the device will present a neat and unobtrusive appearance upon the automobile.
The object therefore of my invention is to provide a simple and efficient device adapted to be mounted upon the cowl of the automobile having an extensible apron adapted to be drawn out and retained in position over the hood of the engine, to thereby prevent the entrance of rain water through the seams between the cowl and the hood, and also through the hinge joint which is usually provided along the top of the hood.
The nature and characteristic features of my invention will be more readily understood from the following description taken in connection with the accompanying drawings forming part hereof, in which, Figure 1 is a top or plan view of the front end of an automobile with the device of my invention mounted in place thereon and having the protecting apron distended in its operative position;
Fig. 2 is a side elevation, partly in section, of the same, and Fig. 3 is an enlarged fragmentary sectional view showing the detail arrangement of the protecting apron and the housing by means of which the same is mounted upon the cowl of the automobile.

Referring to the drawings, the device of my invention is shown in connection with an automobile of the usual type in which the engine 5 is mounted at the forward end of the automobile, having a radiator 6 arranged in front thereof, which radiator is provided with a nipple 7 extending upwardly therefrom. The engine is usually provided in the top with spark plugs 8, and to the rear of the engine is a dash board 9, upon which a coil box 10 is usually mounted which coil box forms part of the electrical equipment for the control of the ignition in the several cylinders of the engine 5, as is well known not only to those skilled in the art, but generally. Automobiles as at present constructed are also usually provided with a wind shield 11, and extending from the lower edge of the wind shield 11 there is usually provided a cowl 12, which varies in shape in the various makes of automobiles, but which usually has a forward and downward slope extending from the lower edge of the wind shield 11 to the rear margin of the engine hood 13. The engine hood 13 is also usually provided along its top medial line with a hinge joint 14, which enables the hood to be lifted on either side to afford access to the engine when required for the purpose of locating trouble, and making repairs. Inasmuch as the engine hood is mounted in such manner as to provide ready access to the engine and its associated parts, it results that between the rear margin of the hood 13 and the forward end of the cowl 12 there exists a crack or seam through which water may readily enter, particularly in heavy rain storms, as it will be readily understood that the water which impinges against the wind shield and cowl will pass downward over the cowl, and as the aforementioned crack or opening exists between the front end of the cowl and the rear margin of the engine hood, some of this water is almost certain to find its way to the interior under the hood, and frequently will pass downward either to the coil box or to some other part of the electrical equipment of the engine. In some designs of automobiles other cracks or seams exist in or about the cowl through which rain water may enter in like manner. Also in the usual construction of the hinge along the top medial line of the hood openings exist through which rain water may enter and thence find its way to the spark plugs or other electrical parts of the engine, causing short-circuiting which seriously interferes with the proper operation of the engine.

In the particular embodiment of my invention shown in the drawings, the same comprises a housing 15, having an integral attaching ear 16, which ear 16 conforms to the shape of the cowl and is secured thereto by means of bolts 17 or other suitable fastening devices. A washer 18 of felt or other suitable material is interposed between the attaching ear 16 and the outer surface of the cowl so as to make a water tight joint and thus prevent the entrance of rain water beneath the attaching ear 16, which rain water would otherwise find its way downward over the cowl and pass to the interior parts as hereinbefore mentioned. The attaching ear 16 extends approximately of the same length across the cowl as that of the housing 15 so as to effectively shed the rain water to the ends thereof.

The housing proper 15 comprises a sheet metal cover approximately more than semicircular in cross section, with its opening arranged downward, and within the housing 15 there is mounted a spring roller 19. The spring roller 19, has attached thereto an apron 20 made of water proof material which apron is adapted to be withdrawn and thereby unrolled from the roller against the tension of the controlling spring 21. The construction of the spring controlled roller 19 is of the usual type such for example as are used for window shades and the like, except, however, that in the present instance no pawls or detents are needed or desired to lock the roller in desired positions, as in the present instance the roller is at all times under tension of the spring 21 which serves to retract and roll up the apron 20 on the roller 19.

The apron 20 is preferably of a tapered shape as shown, with its small end forward and of a length sufficient to extend outward to a point slightly beyond the radiator nipple and cap, and for maintaining the apron distended when desired the front end thereof may be provided with an aperture 22 through which the radiator cap and nipple may be passed. The front end of the apron may be provided with a rod 23 or other suitable stiffening member, and as said rod extends across the front end of the apron it will engage the front side of the radiator nipple when the same is passed through the aperture 22 at the front end of the apron 20, and thus serve to maintain the apron distended while at the same time the spring 21 in the roller 19 will maintain the apron taut.

The front end of the apron 20 may also be provided with a hand tab 24 to assist in the manipulation of the same, and furthermore there may be provided a projecting stop member 25 which will serve to limit the retraction of the apron 20 when the front end thereof passes beneath the housing 15.

It will be seen that when the device as hereinbefore described is arranged in its operative condition, with the apron 20 distended, and having the front end thereof engaging the radiator nipple, when rain water passes downward from the wind shield and the top portion of the cowl the same will be shed to the sides of the housing 15 and its attaching ear 16, and thus be prevented from passing down through the central portion of the seam or joint between the cowl and the hood. The apron passing from the underside of the housing outward will prevent any water running down over the top of the housing 15 from passing onward into said seam, and the portion of the apron 20 which extends outward over the hood 13 will prevent the entrance of rain water through the joints of the hinge to the interior and thus coming in contact with the electrical parts of the motor unit.

It will also be noted that when the apron is distended in its operative position it will be maintained a slight distance above the engine hood so therefore the water-proof material of which it is composed will not be damaged by the heat of the engine as would be the case if it were in direct contact with said hood or arranged within said hood directly over the engine, and furthermore that the arrangement of the housing and the tapered shape of the apron will insure the proper shedding of the rain water to such places as will result in carrying the same away from the parts that might otherwise be deranged thereby.

Having thus described the nature and characteristic features of my invention, which I claim as new and desire to secure by Letters Patent is:—

1. A rain shield for automobile power units comprising a housing mounted upon the cowl of the automobile between the wind shield and the engine hood and provided with means for preventing the passage of water beneath the same, and an apron mounted in said housing normally maintained retracted therein and adapted to be drawn out over the top of the engine hood.

2. A rain shield for automobile power units comprising a housing mounted upon the cowl of the automobile between the wind shield and the engine hood and provided with an attaching ear and means for preventing the passage of water beneath the same, and an apron mounted in said housing normally maintained retracted therein and adapted to be drawn out over the top of the engine hood.

3. A rain shield for automobile power units comprising a housing mounted upon the cowl of the automobile between the wind shield and the engine hood and provided with means for preventing the passage of water beneath the same, an apron mounted in said housing normally maintained retracted therein and adapted to be drawn out over the top of the engine hood, and means for maintaining said apron distended from its supporting housing over the top of said engine hood.

4. A rain shield for automobile power units comprising a housing mounted upon the cowl of the automobile between the wind shield and the engine hood and provided with means for preventing the passage of water beneath the same, an apron mounted in said housing normally maintained retracted therein and adapted to be drawn out over the top of the engine hood, said apron having an aperture in its free end adapted to be engaged by the radiator nipple of the automobile to thereby maintain said apron distended from its supporting housing over the top of said engine hood.

5. A rain shield for automobile power units comprising a housing mounted upon the cowl of the automobile between the wind shield and the engine hood and provided with means for preventing the passage of water beneath the same, and an apron mounted in said housing normally maintained retracted therein and adapted to be drawn out over the top of the engine hood, said apron having an aperture in its free end adapted to be engaged by the radiator nipple of the automobile to thereby maintain said apron distended from its supporting housing over the top of said engine hood, and a stiffening member arranged in the front end of said apron.

6. A rain shield for automobile power units comprising a housing mounted upon the cowl of the automobile between the wind shield and the engine hood and provided with means for preventing the passage of water beneath the same, a spring roller mounted in said housing, and an apron mounted upon said roller normally maintained retracted thereon, said apron being adapted to be drawn out over the top of the engine hood.

7. A rain shield for automobile power units comprising a housing mounted upon the cowl of the automobile between the wind shield and the engine hood and provided with an attaching ear and means for preventing the passage of water beneath the same, a spring roller mounted in said housing, and an apron mounted upon said roller normally maintained retracted thereon, said apron being adapted to be drawn out over the top of the engine hood.

8. A rain shield for automobile power units comprising a housing mounted upon the cowl of the automobile between the wind shield and the engine hood and provided with means for preventing the passage of water beneath the same, a spring roller mounted in said housing, an apron mounted upon said roller normally maintained retracted thereon, said apron being adapted to be drawn out over the top of the engine hood, and means for maintaining said apron distended from its supporting housing over the top of said engine hood.

9. A rain shield for automobile power units comprising a housing mounted upon the cowl of the automobile between the wind shield and the engine hood and provided with means for preventing the passage of water beneath the same, a spring roller mounted in said housing, an apron mounted upon said roller normally maintained retracted thereon, said apron being adapted to be drawn out over the top of the engine hood and having an aperture in its free end adapted to be engaged by the radiator nipple of the automobile to thereby maintain said apron distended from its supporting housing over the top of said engine hood.

10. A rain shield for automobile power units comprising a housing mounted upon the cowl of the automobile between the wind shield and the engine hood and provided with means for preventing the passage of water beneath the same, and an apron mounted in said housing normally maintained retracted therein, said apron being tapered toward the front and adapted to be drawn out over the top of the engine hood.

In testimony whereof, I have hereunto signed my name.

JOSEPH A. BROWN.